United States Patent [19]
Martin et al.

[11] 3,794,917
[45] Feb. 26, 1974

[54] ELECTRONIC WATT TRANSDUCER

[75] Inventors: Joseph A. Martin, Hilliard; James M. Hoover, Columbus, both of Ohio

[73] Assignee: Esterline Corporation, New York, N.Y.

[22] Filed: Mar. 9, 1972

[21] Appl. No.: 233,067

[52] U.S. Cl. .............................................. 324/142
[51] Int. Cl. ........................................... G01r 21/00
[58] Field of Search ..................... 324/142; 307/251

[56] References Cited
UNITED STATES PATENTS

| | | | |
|---|---|---|---|
| 3,500,200 | 3/1970 | Woodhead .......................... | 324/142 |
| 3,636,378 | 1/1972 | Chashi et al. ....................... | 307/251 |

Primary Examiner—Alfred E. Smith
Attorney, Agent, or Firm—Woodard, Weikart, Emhardt & Naughton

[57] ABSTRACT

A potential input circuit and a current input circuit, each having a transformer therein, receives the input information from the power line for which the true electrical power is to be measured. The scaled output from the potential input circuit, and a triangle wave signal from a generator therefor are coupled to a comparator (level crossing detector) employing an open loop operational amplifier (op amp) having an output controlling electronic switches to gate the current transformer secondary current, with a duty ratio proportional to voltage amplitude and polarity. The gated output of the current transformer is filtered and coupled through an amplifier, or directly, to an external load. The filtered output is in the form of a linear direct current analog of true power in the power line.

4 Claims, 10 Drawing Figures

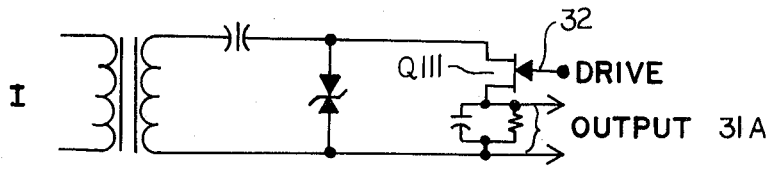
FIG. 4
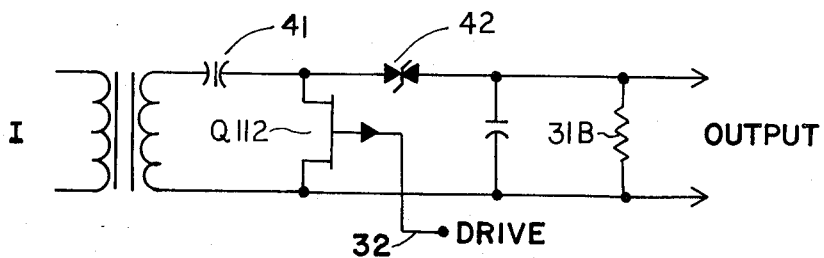
FIG. 5
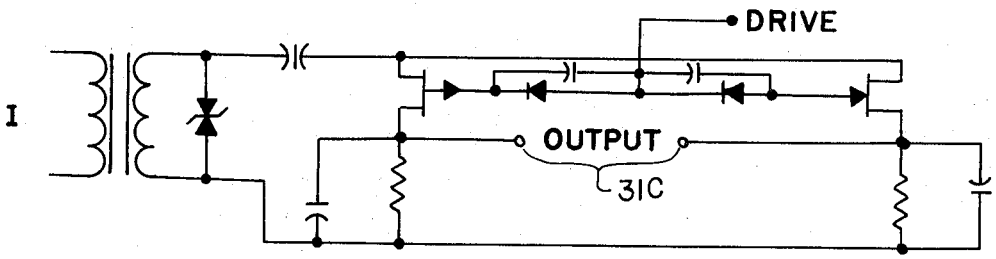
FIG. 6
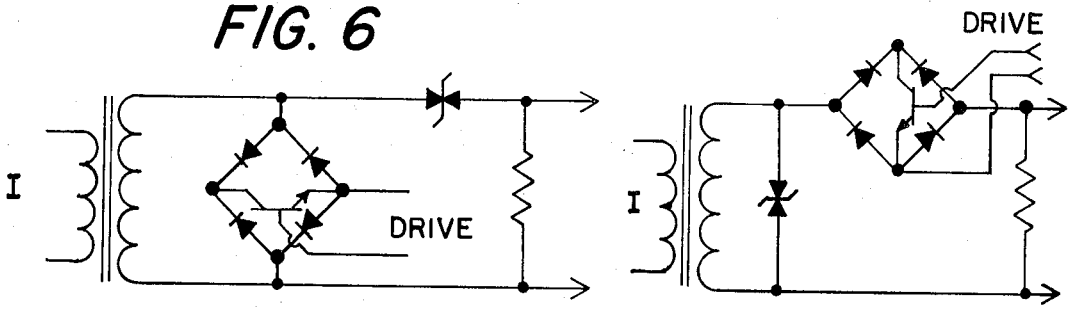
FIG. 7
FIG. 8
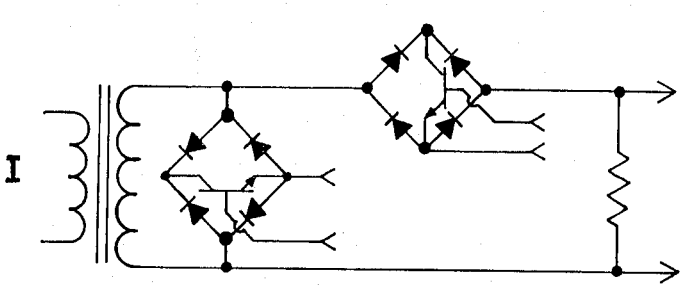
FIG. 9

ELECTRONIC WATT TRANSDUCER

BACKGROUND OF THE INVENTION

1. Field of the Invention: This invention relates generally to multiplier circuitry, and more particularly to amplitude modulation/pulse width modulation (AM/PWM) multipliers. The constant current nature of a current transformer is exploited in the switching function to obtain high accuracy, stability and reliability.

2. Description of the Prior Art: Various types of watt transducers are known. One type which is said to have high accuracy is a watt converter type 2885 marketed by Yokogawa Electric Works Ltd. of Tokyo, Japan. This apparatus employs a time division multiplier and, while high accuracy may be obtainable, the cost is high.

Another type of watt transducer employs the Hall Effect. Although such transducers are comparatively inexpensive, there are some instances where their accuracy is less than needed. The present invention is directed toward providing a product having comparatively high accuracy at a comparatively low cost, with desirable stability and reliability characteristics.

SUMMARY OF THE INVENTION

Described briefly, in a typical embodiment of the present invention, the output of a scaling transformer of a potential input circuit is coupled to an input of a comparator. A precision triangle waveform is coupled to another input of the comparator. Electronic switches are provided in the secondary circuit of the current transformer of a current input section, and are controlled by the output of the comparator. The duty ratio of the positive and negative portions of the comparitor output is proportional to the voltage amplitude and polarity on the power line, and the inherent constant current source characteristic of the current transformer is employed to minimize the effect of any imperfections in switching. Thus no amplification is needed on either input, and signal levels are high enough to avoid thermal drift and noise problems.

Some additional features include the combination of a bipolar clamp and integrator for precision in the triangle wave generator, and complementary drive of a pair of transistors in a power supply for high gain in a series pass regulator.

BRIEF DESCRIPTION OF THE DRAWINGS

FIG. 4 shows a current transformer output switching scheme more rudimentary than that shown in FIG. 3 and not as suitable.

FIG. 5 shows a still more rudimentary output switching scheme, which is still less beneficial, but of possible utility.

FIG. 6 is a switching scheme capable of producing a full wave output.

FIG. 7 is an arrangement similar to FIG. 5 but employing a junction transistor instead of a field effect transistor (FET).

FIG. 8 is an arrangement similar to FIG. 4 but employing a junction transistor.

FIG. 9 is switching scheme similar to that employed in FIG. 3 but using junction transistors instead of field effect transistors.

DESCRIPTION OF THE PREFERRED EMBODIMENT

Figure 1:
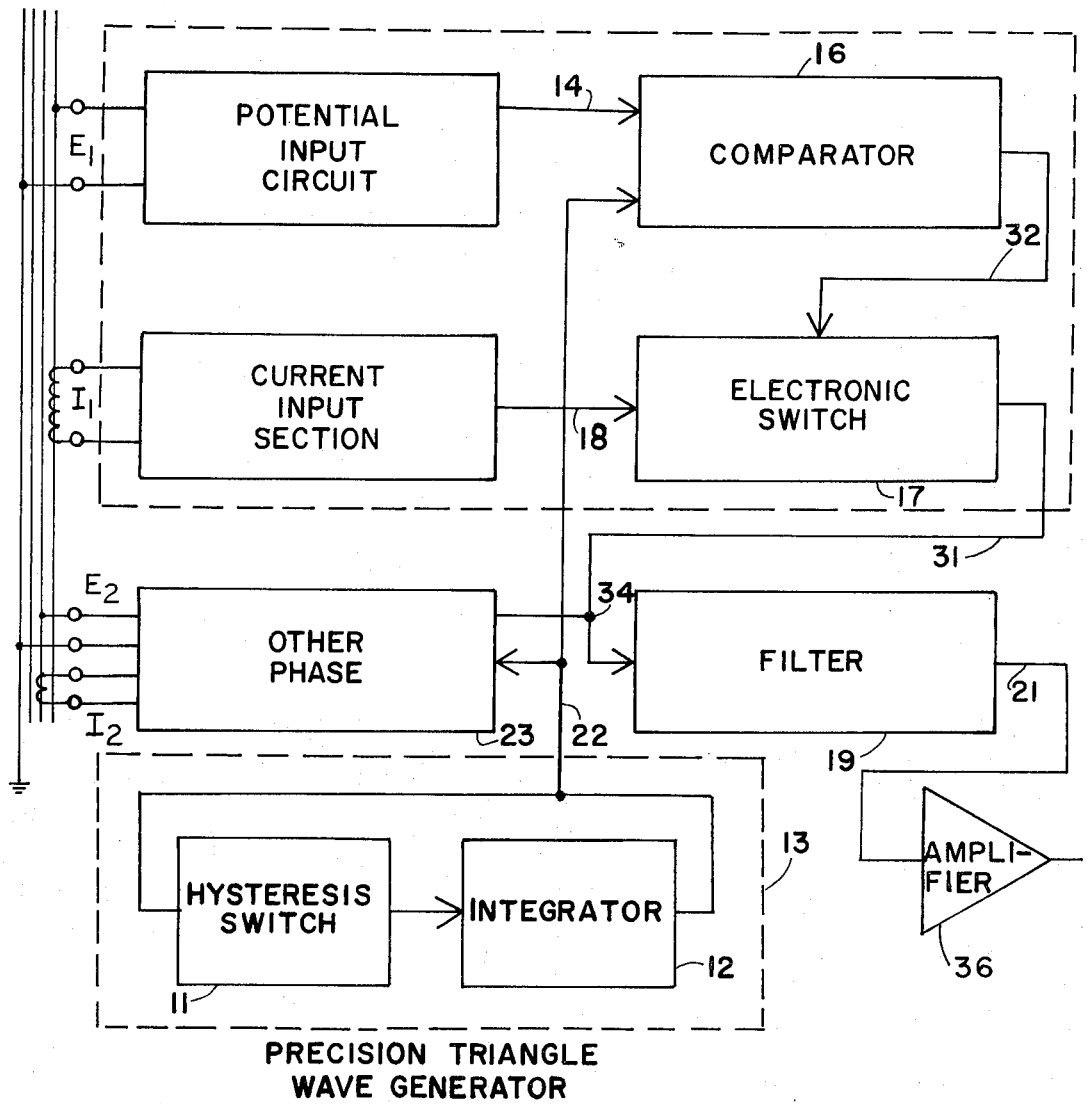
FIG. 1 is a block diagram of an electronic watt transducer incorporating a typical embodiment of the present invention.
Figure 3:
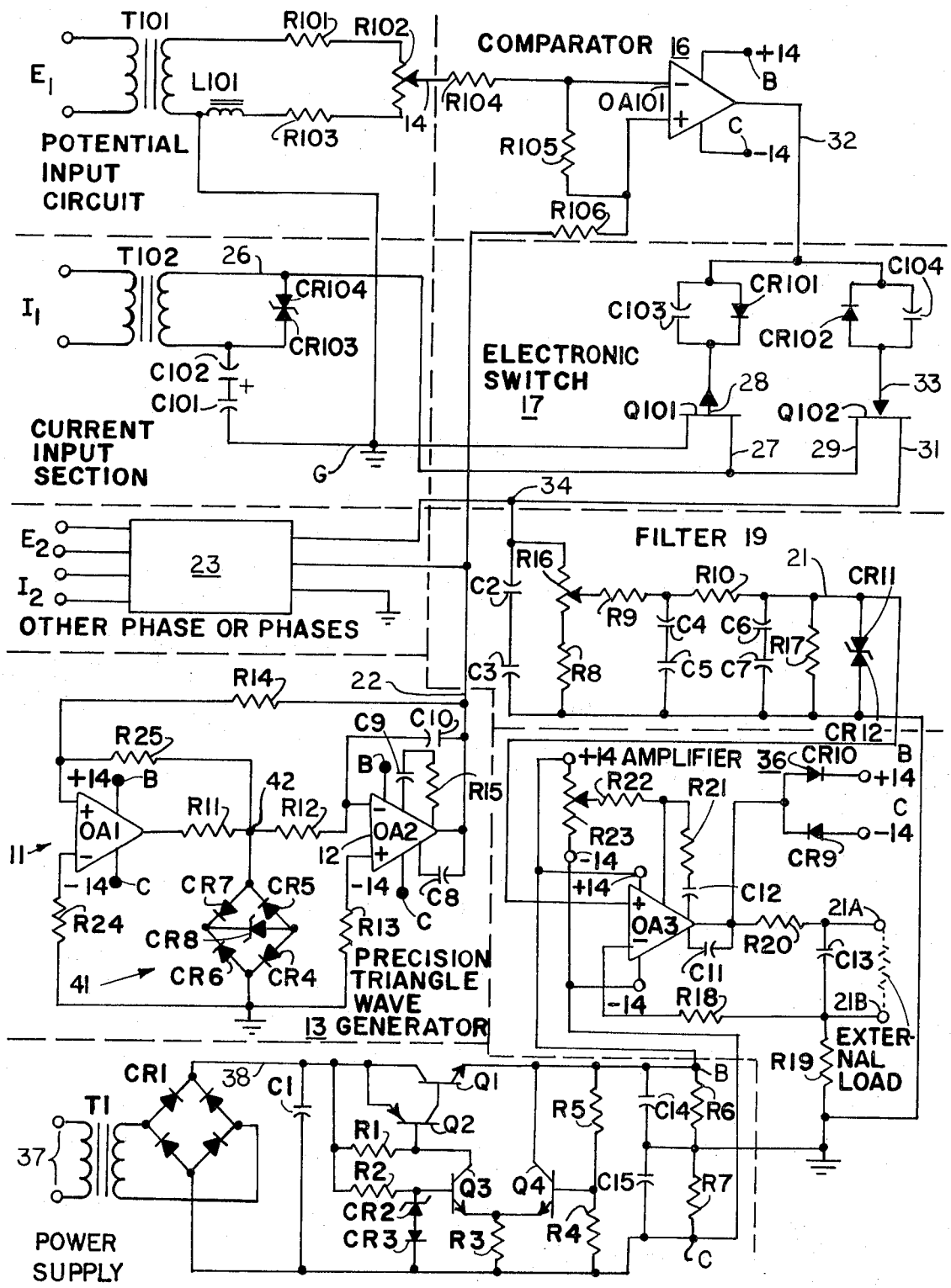
FIG. 3 is a schematic diagram of the watt transducer of FIG. 1.

Referring now to FIGS. 1 and 3, a hysteresis switch 11 and integrator 12 combine to form a highly linear triangular waveform generator 13. The triangular waveform is generated at a somewhat higher frequency (approximately 1,200 Hz) than the 60 Hz frequency of the AC power being measured, and is centered about ground. The triangle, along with the voltage derived at 14 from the voltage transformer T101 of the potential input circuit, is fed to a comparator 16, the output of which causes the conductive state of the electronic switching means 17 to change, each time the two waveforms become coincident. The electronic switching means 17 gates the output of a current transformer T102 of the current input section into conductor 31 providing an input to the multi-stage RC ripple filter 19. The output of the ripple filter at 21 is a linear DC analog of true power.

Figure 2A:
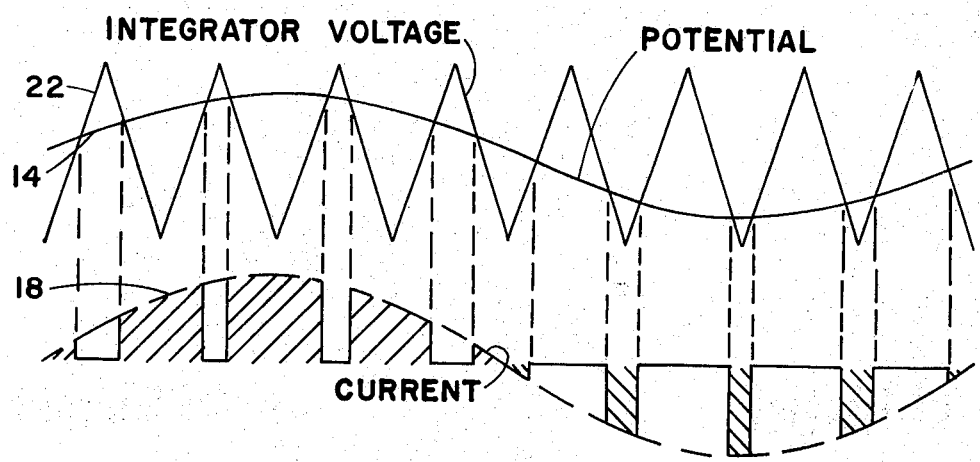
FIG. 2A is a waveform diagram illustrating a waveform relationship which may be involved for an input signal condition where the power factor is unity.

Referring now to FIG. 2A, waveform 22 represents the triangular wave out of the waveform generator 13 of FIG. 1 at 22. The waveform from the potential transformer is represented by line 14. Waveform 18 is representative of the current in the secondary of the current transformer. It is in phase with the potential transformer input, both waveforms being sinusoidal. For convenience of illustration, all waveforms are illustrated for one complete cycle of the power frequency being measured. Also, the triangular voltage from the integrator is shown as an integral multiple of the power frequency. However, this condition is not a necessity for proper multiplier operation and is shown only for facilitating the explanation.

Coincidence of the triangular output voltage from the integrator with the potential transformer voltage 14 causes the electronic switching apparatus 17 (FIG. 1) to gate or pulse width modulate, the current 18, shown in the lower waveform. The modulation provides a greater switch dwell time during the positive half cycle of the power frequency sine wave than during the negative half cycle (during forward power conditions). The cross-hatched area represents the period when the switching means would be conducting, and it is these areas which are averaged by the filter circuit to yield a DC output voltage proportional to the power being measured. It can be seen that for the unity power factor situation represented by FIG. 2A there is a net positive value in the cross hatched area and this results in a positive DC output from the filter circuit. Since the cross hatched area is proportional both to the current amplitude and width of modulation due to the potential input, the DC output voltage is proportional to the product of these two quantities.

Figure 2B:
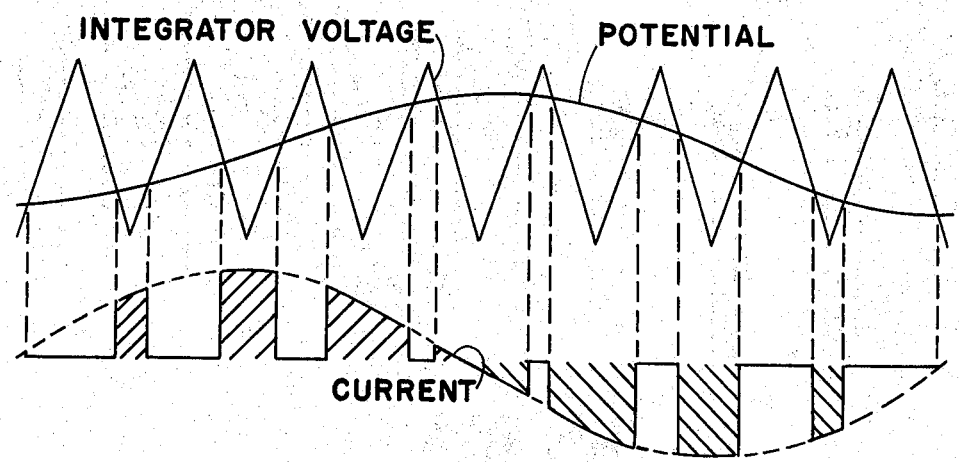
FIG. 2B illustrates a 90° leading power factor condition.

Referring now to FIG. 2B, where the input current is shown leading the potential voltage by 90°, the switch conduction interval is modulated throughout the power frequency cycle as indicated by the cross hatched areas. In this instance, the modulation is centered about the power frequency peaks and produces identical effects on each power frequency half cycle. The net positive cross hatched area equals the net negative area, and an average power of zero is therefore indicated. A 90° lagging power factor current input produces the same result with similar waveforms. With input voltage and current phase ranging between zero and 90°, the unit output is proportional to $E \times I \times \cos\theta$, thus measuring true electrical power.

Referring now to FIG. 3, the potential input terminals $E_1$ are connected to the primary winding of a precision potential ratio transformer T101. The secondary winding thereof is connected across the combination of resistor R101, potentiometer R102, resistor R103, and inductor L101. The wiper of potentiometer R102 provides the output through resistor R104 to the comparator 16, and more particularly to the upper input terminal of the operational amplifier OA101 of the comparator. The lower end of the transformer secondary winding of the potential input circuit is connected to ground G.

The triangular wave signal from the triangle wave generator 13 is connected on line 22 through resistor R106 to the lower input terminal of the op amp OA101, and a resistor R105 is connected across the two input terminals of the op amp. The positive and negative direct current supply of the op amp 101, are labelled respectively B and C, and corresponding terminals of the power supply 24 are provided with the same legends to designate the source of these levels of energy.

The current input terminals $I_1$ are connected across the primary winding of the current transformer T102. The upper end of the secondary winding of transformer T102 is conductor 26, and is connected to one load lead 27 of the field effect transistor (FET) Q101, the other load lead of which is connected to ground. This transistor is of a type which is turned off upon the presence of a positive signal at its gate input 28. Oppositely oriented zener diodes CR103 and CR104 are connected across the secondary winding of the transformer, and the lower end of the winding is connected through a pair of capacitors C101 and C102 to ground.

The upper end conductor 26 of the current transformer secondary is also connected to the load conductor 29 of a second field effect transistor Q102, the other conductor 31 of which provides an output to the filter 19.

For control of the FET Q101, the output conductor 32 of the comparator is connected through diode CR101 to the gate 28 thereof. Capacitor C103 is connected across the diode CR101.

To provide the signal to the gate of FET Q102, the comparator output conductor 32 is connected through diode CR102. Capacitor C104 is in shunt with diode CR102. FET Q102 is of a type such that it is turned off during the presence of a negative signal at its gate 33. For the transformer secondary circuit to operate in a linear fashion, both FET Q101 and Q102 should be such as not to both be "off" (non-conducting) at the same time during the switching thereof in the circuit operation. Depletion types, which are "on" with a zero bias, are preferable.

The components in circuit 23 are for a second phase, having inputs $E_2$ and $I_2$ and are identical to those just described in the first phase. Circuit 23 includes the potential input circuit, the comparator, the current input section and the electronic switching means. Other phases can be added if desired, depending upon the type of input power to be measured. While the expression "power line" is used herein, it should not be interpreted as limited to power distribution lines of electric utility companies.

The output of the first phase, and those of the other phase or phases, are connected together at junction 34 and coupled to the filter 19. This is a bipolar multistage ripple filter converting the pulsating DC input thereto at 34 to a steady DC output at 21. Because it is of conventional construction detailed description is not necessary.

Where the load to be driven by the watt transducer can use less than 1 volt from a source impedance of 500 ohms, no amplifier is needed. For higher level outputs, the amplifier 36 can be employed. It includes an operational amplifier OA3, having an input coupled to the output terminal 21 from the filter 19. The other input is connected through resistor R18 and the external load and shunting capacitor C13 to the output terminal 21A. The junction of capacitor C13 and R18 provides the other output terminal 21B.

Potentiometer R23 provides the the offset or zero adjustment, being coupled through resistor R22 to the op amp. Resistor R21 and capacitors C12 and C11 provide the stabilization that work for this particular op amp. The diodes CR9 and CR10 connected to the negative and positive DC output terminals C and B of the power supply, and resistor R20, protect the op amp from transients, as does the pair of Zener diodes CR11 and CR12 across the output of filter 19. Feedback resistor R19, sensing current flowing through the load, feeds back through resistor R18 to the inverting input of the op amp OA3, to cause the load current to remain constant, independent of the load resistance value, within the limitations of the power supply 24. Constant voltage amplification may be employed equally well with minor modifications.

The power supply 24 is a regulated power supply which may have a 110 volt AC input across terminals 37, for example, to the primary of transformer T1. The secondary thereof is coupled through a full wave rectifier CR1 and filter stage C1. NPN transistor Q1 and PNP transistor Q2 are connected so as to provide a complementary drive in the power supply, providing high gain in a series-pass regulator. The emitter of transistor Q1 provides the positive, B, direct current output terminal. The base of transistor Q2 is connected to the collector of transistor Q3, the emitter of which is connected through resistor R3 to the "C" output terminal. Typically the level of potential at the B terminal is 14 volts positive referred to ground G and at the C terminal is 14 volts negative.

Zener diode CR2, in series with diode CR3, provides a temperature compensated reference voltage, supplied by resistor R2 connected to the conductor 38. Transistors Q3 and Q4 are normally on. Resistors R6 and R7, together with their associated capacitors, provide a voltage divider for the positive and negative outputs.

Referring further to FIG. 3, the triangle wave generator 13 includes a hysteresis switch 11, with the operational amplifier OA1 serving this function. It is a high gain device employing positive DC feedback through resistor R25 whereby the output of the device latches at either positive or negative saturation. The op amp OA2 serves as the integrator 12 of FIG. 1, and integrates the output of the hysteresis switch to generate the triangular waveform on conductor 22. Although such circuits are known, a brief further description may be helpful.

It may help to assume that initially the hysteresis switch is in positive saturation.

The positive output of the hysteresis switch appears across R11 and bipolar clamp 41 which clamps the voltage at junction 42 to a fixed value. Because the summing junction of the integrator appears as a virtual ground and junction 42 is clamped to a fixed value the voltage across R12 is constant, therefore, the current through R12 is constant. The constant current through R12 also goes through capacitor C10 resulting in a constant current through capacitor C10 which causes the integrator output to decrease linearly with time. If resistors R14 and R25 are equal, then when the integrator output is negatively just equal to the positive clamped voltage at junction 42, the positive terminal of the hysteresis switch will be at zero volts. A slight additional decrease in integrator output causes the positive input terminal of the hysteresis switch to go slightly negative snapping the hysteresis switch output from positive to negative saturation because of the regenerative feedback. The capacitor charging current reverses and the integrator slope becomes positive. The capacitor integrates until the positive integrator output equals the negative clamped voltage at junction 42 and regeneration occurs once again. A square wave output is developed at the output of the hysteresis switch and clamped to a fixed value at junction 42 by bipolar clamp 41, and a triangular wave appears at the output of the integrator.

The triangle wave frequency is governed by resistor R12 and capacitor C10. Triangle wave frequency is not critical so resistor R12 and capacitor C10 need not be temperature stabilized components. The amplitude of the triangle waveform is controlled by resistors R14 and R25 and the positive and negative clamped voltage values at junction 42 determined by the bipolar clamp 41. The amplitude of the triangular waveform is important since the percentage of modulation of the electronic switch is controlled by the ratio of potential transformer circuit output voltage to the integrator output voltage.

A bipolar clamp 41 is connected between the junction of resistors R11 and R12 to ground. The Zener diode CR8 is selected so that its temperature characteristics compensate for the other diodes. This clamp assures the precision of the waveform produced at the output of the integrator.

Now that the circuitry has been described, perhaps its operation will be readily apparent to those skilled in the art, without further description. Nevertheless, some description may be helpful. The comparator 16 compares the low frequency input from the power line under surveillance (zero to 400 Hz, for example) with the high frequency triangle waveform received from the triangle wave generator. Thus the potential input at terminal $E_1$ is scaled through the transformer and resistors in the input circuit and compared directly to the triangle wave level. As the levels cross, the comparator op amp changes state and alternates the state of the electronic switches, (field effect transistors). For example, when the op amp output on conductor 32 goes negative current flows from the current transformer secondary winding on conductor 26 through FET Q101 to ground. Also FET Q102 is shut off. Accordingly, there is no output during this period on conductor 31 to junction 34. When the comparitor op amp changes state, its output on conductor 32 goes positive. It thereupon biases through diode CR101 and capacitor C103 and cuts off FET Q101. At the same time the potential on the gate 33 of Q102 goes positive and conducts the signal on the transformer secondary conductor to the output conductor 31 and junction 34. The values of capacitors C103 and C104 are selected consistent with the characteristics of FETs Q101 and Q102 so that the transformer secondary is never effectively open circuited, despite the switching of the FETs. Thus the transformer secondary "sees" a somewhat constant load, uninterrupted by the switching. In this connection FET Q101 serves to prevent any open circuit from ever appearing across the secondary of T102. Capacitors C101 and C102 serve to avoid any net DC component in the secondary of transformer T102.

It is a principal feature of this invention to use the switching of the output of the current transformer to provide the output to the filter. As the current transformer is inherently a constant current source, the finite resistance of each of the FETs is not a cause of error during the on state of either one of them. The ratio of the "off" resistance of FET Q101 to the "on" resistance of Q102, for example, is so high that leakage through Q101 is of no consequence. Therefore the output at 31 is a pulse width modulated amplitude modulated signal, with the amplitude modulation thereof being the direct result of the current transformer output, unencumbered by imperfections in switching devices. Thus the current transformer secondary current is gated by the switches, with a duty ratio proportional to the voltage amplitude and polarity. The current at conductor 31 from this first phase is typified by the lower waveform in FIG. 2B.

The resistor R105 shunting the inputs of the op amp OA101 of the comparator avoids the possibility of the dynamic impedance of the op amp being reflected at the inputs. Accordingly, switching takes place from a low impedance to a low impedance, rather than from a low impedance through a high impedance.

As suggested above, high accuracy, stability and reliability are realized through the extreme simplicity of the voltage and current inputs. That is, no amplification is required on either of the inputs, and signal levels are high enough to avoid thermal drift and noise problems.

In the power supply, it was mentioned above that the Zener diode CR2 establishes the reference potential on the base of transistor Q3, with diode CR3 providing temperature compensation. In operation, when the potential at the base of transistor Q4 rises to the reference potential, transistor Q4 is turned on, diverting current from transistor Q3 because of the common emitter resistor R3. Therefore conduction in transistor Q3 decreases, reducing conduction in Q2 and thereby reducing current in Q1. This results in a reduction of potential at the base of transistor Q4, reducing its conductivity. The result is that conduction in Q3 increases and the effects are the opposite of that just described when transistor Q4 is turned on. The complementary connection of transistors Q1 and Q2 provides a higher gain and lower power dissipation than would a Darlington connection, so a lower voltage drop on the pass transistor Q1 is sufficient to drive it. The differential pair of transistors Q3 and Q4 serves to drive the pass transistor Q1 through driver transistor Q2. Resistors R4 and R5 are scaling resistors to scale the supply voltage to the reference level.

The present invention could be employed with a feedback multiplier using a variable frequency scheme to modulate gates to the FETs, and achieve similar results to the present use in the pulse width modulated-/amplitude modulated multiplier. In the electronic switch of the embodiment illustrated in FIG. 3, two FETs of the same type could be driven by feeding the drive input of one through an inverter. A more rudimentary type of switching means than that shown in FIG. 3 is shown in FIG. 4, where FET Q111 has its gate connected to the conductor 32 from the comparator, and the output is at terminals 31A.

In FIG. 5, FET Q112 has its gate coupled to comparator output conductor 32 and is driven thereby. Capacitor 41 provides DC blocking to prevent direct current from saturating the transformer. The double Zener diode 42 prevents leakage through the load by imposing a resistance much higher than the resistance of the FET when the FET is turned on, thus effectively diverting the output from the current transformer through the FET when it is turned on, precluding current flow through output resistor 31B while the FET is on. When the FET turns off, the transformer drives through the Zener 42 to the load. This circuit would provide a higher burden on the transformer and result in less accuracy than the circuit of FIG. 4. Thus the circuit of FIG. 4, reducing the burden on the current transformer during the measuring interval, provides better linearity and accuracy than in FIG. 5. The switching embodiment of FIG. 3 reduces the burden still further, because in this embodiment there is needed nothing more than overcoming the drop of the FETs (one half volt) in contrast to the 8 volts of the Zener diode in FIG. 4, during the off interval. When the FETs of FIG. 3 are turned on, the Zener diode is doing nothing. If, during commutation, both FETs are momentarily off, the Zener diode combination CR103 and CR104 of FIG. 3 limits the voltage on conductor 26 to a safe voltage.

In FIG. 6, where the output is taken across terminals 31C, the arrangement is presented to provide a full wave output. This produces an output both when the drive is positive and when the drive is negative. Accordingly there is much less ripple and twice the amount of energy output to the filter and output meter and amplifier, as the case may be.

While the illustrated embodiment described this far, shows FETs employed as switching devices, FIGS. 7, 8 and 9 show arrangements of switching means corresponding, respectively, to FIGS. 5, 4 and 3, but employ junction transistors instead. It seems probable that various other types of switching devices, if capable of sufficient speed may be useful in the practice of the present invention.

An example of some component values employed in one embodiment of the invention is as follows:
T101 — 30:1 turns ratio
T102 — 1:900 turns ratio
C103, 104 — 82 pf
CR101, 102 — 1N458
Q101 — P1086E "Amelco"
Q102 — 2N4092 Motorola
C101, 102 — 22 $\mu f$ at 15
C4, 3 — 39 $\mu f$ at 10

While the invention has been described and disclosed in some detail in the drawings and foregoing description, they are to be considered as illustrative and not restrictive in character, as other modifications may readily suggest themselves to persons skilled in this art and within the broad scope of the invention.

The invention claimed is:

1. A transducer for use in measurement of true electrical power carried in an alternating current power line and comprising:
   first input means for obtaining a signal proportional to the instantaneous voltage on the power line;
   second input means for obtaining a signal proportional to the instantaneous current in the power line;
   modulating means having an input coupled to said first input means and having an output, for producing at said output a pulse width modulated signal in which the width of each pulse of modulated signal is proportional to a voltage on the power line during a time period corresponding to that pulse;
   gating means having an input coupled to said second input means, an output, and a control input, said control input being coupled to said output of said modulating means for making a circuit path from said input of said gating means to said output of said gating means in accordance with the pulses of said modulated signal; and
   integrating means having an input coupled to said output of said gating means for integrating the output of said gating means whereby a signal representative of the true electrical power on the power line is produced;
   said second input means including inductive coupling means,
   said gating means including two gating circuits sharing said control input,
   one of said gating circuits including a first switching means having a load circuit path in series between said inductive coupling means and the input of said integrating means,
   the other of said gating circuits including a second switching means having a load circuit path in a circuit branch across said inductive coupling means,
   said first and second switching means being of types responding oppositely to a given polarity of signal at the control terminal thereof whereby each of said switching means is on when the other of said switching means is off.

2. A transducer for use in measurement of true electrical power carried in an alternating current power line and comprising:
   first input means for obtaining a signal proportional to the instantaneous voltage on the power line;
   second input means for obtaining a signal proportional to the instantaneous current in the power line;
   modulating means having an input coupled to said first input means and having an output, for producing at said output a pulse width modulated signal in which the width of each pulse of modulated signal is proportional to a voltage on the power line during a time period corresponding to that pulse;
   gating means having an input coupled to said second input means, an output, and a control input, said control input being coupled to said output of said modulating means for making a circuit path from said input of said gating means to said output of said gating means in accordance with the pulses of said modulated signal; and integrating means having an input coupled to said output of said gating means for integrating the output of said gating means whereby a signal representative of the true electrical power on the power line is produced;

said first input means including a first transformer, and said second input means including a second transformer;

said gating means including two gating circuits sharing said control input;

one of said gating circuits including a first switching means having a load circuit path in series between a secondary winding of said second transformer and the input of said integrating means, and the other of said gating circuits including a second switching means having a load circuit path in a circuit branch across said secondary winding, said first and second switching means being of types responding oppositely to a given polarity of signal at said control input whereby each of said switching means is on when the other of said switching means is off.

3. A method of multiplication of voltage and current on a power line comprising the steps of:

comparing a replica of the voltage on the power line with a periodic signal to produce a pulse width modulated signal, using said pulse width modulated signal for gating to an output a current replica corresponding to the current in the power line but scaled down by the transformer ratio; and, obtaining the current replica from alternating current in the power line by use of a current transformer and utilizing the inherent current source characteristics of said current transformer to negate the "on" resistance of the means used for said gating.

4. In a process of obtaining and gating a replica of current in a power line, a method to negate the on resistance of the gating means used, the method comprising the step of:

employing a current transformer with its secondary winding in the circuitry including the gating means, thereby using the inherent current source characteristic of the current transformer to cause current in its secondary to be proportional to current in its primary regardless of secondary resistance within reason, i.e., typical change in current output going from 0 to 200 ohms in gating means "on" resistance would be less than 0.02 percent.

* * * * *